(12) United States Patent
Hottelier et al.

(10) Patent No.: US 12,339,850 B2
(45) Date of Patent: Jun. 24, 2025

(54) QUERY ACCELERATION AND METADATA CACHING

(71) Applicant: Google LLC, Mountain View, CA (US)

(72) Inventors: Thibaud Hottelier, Seattle, WA (US); Anoop Kochummen Johnson, Fremont, CA (US); Justin Levandoski, Seattle, WA (US); Deepak Choudhary Nettem, Sunnyvale, CA (US); Yuri Volobuev, Walnut Creek, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/195,577

(22) Filed: May 10, 2023

(65) Prior Publication Data

US 2024/0378204 A1 Nov. 14, 2024

(51) Int. Cl.
*G06F 16/2455* (2019.01)
*G06F 16/2453* (2019.01)
*G06F 16/25* (2019.01)

(52) U.S. Cl.
CPC .. *G06F 16/24552* (2019.01); *G06F 16/24544* (2019.01); *G06F 16/254* (2019.01)

(58) Field of Classification Search
None
See application file for complete search history.

(56) References Cited

U.S. PATENT DOCUMENTS

| 9,792,298 | B1 * | 10/2017 | Taylor | G06F 16/1844 |
| 11,163,756 | B2 | 11/2021 | Muralidhar et al. | |
| 2014/0188814 | A1 * | 7/2014 | Venkatrao | G06F 16/972 |
| | | | | 707/689 |
| 2014/0258373 | A1 * | 9/2014 | Lerman | H04L 51/06 |
| | | | | 709/203 |
| 2017/0124105 | A1 | 5/2017 | Kaushik et al. | |
| 2017/0220605 | A1 * | 8/2017 | Nivala | G06F 16/282 |
| 2018/0018343 | A1 * | 1/2018 | Zukowski | G06F 16/9535 |
| 2022/0114163 | A1 * | 4/2022 | Seetharaman | G06F 16/2379 |
| 2023/0205757 | A1 * | 6/2023 | Gupta | G06F 16/254 |
| | | | | 707/703 |
| 2024/0069994 | A1 * | 2/2024 | Chen | G06F 21/6227 |

FOREIGN PATENT DOCUMENTS

CN 103595761 A 2/2014

OTHER PUBLICATIONS

Edara et al. Big Metadata: When Metadata is Big Data. Jul. 1, 2021. Proceedings of the VLDB Endowment, vol. 14, No. 12, pp. 3083-3095.
International Search Report and Written Opinion for International Application No. PCT/US2024/027180 dated Jul. 10, 2024. 14 pages.

* cited by examiner

*Primary Examiner* — Irene Baker
(74) *Attorney, Agent, or Firm* — Lerner David LLP

(57) ABSTRACT

Aspects of the disclosure are directed to a metadata cache for extending data warehouse features to data lakes. The metadata cache can accelerate query execution by directly accessing unmanaged data from the data lake rather than accessing the data through the data warehouse. The metadata cache can allow for filtering the unmanaged data to improve the speed of retrieving data for executing a query.

18 Claims, 5 Drawing Sheets

QUERY ACCELERATION AND METADATA CACHING

BACKGROUND

A data lake can correspond to a repository containing unmanaged data while a data warehouse can correspond to a repository containing managed data. For a cloud storage system that aims to unify data lakes and data warehouses, the data warehouses cannot control lifecycles of the unmanaged data stored in the data lakes. For example, the unmanaged data can be added or removed at any time without being processed through the data warehouse. Because the data warehouses cannot control the lifecycle of the unmanaged data stored in the data lakes, the data warehouses must exhaustively list all files to retrieve the unmanaged data for a query execution, which can delay processing of queries.

BRIEF SUMMARY

Aspects of the disclosure are directed to extending data warehouse features to data lakes with a metadata cache. The metadata cache can accelerate processing of queries by directly accessing unmanaged data from the data lake rather than loading the data into the data warehouse. The data warehouse no longer needs to exhaustively list all files, since the metadata cache can contain relevant metadata for accessing the unmanaged data.

An aspect of the disclosure provides for a method for processing queries, including: receiving, by one or more processors, a request from a query engine to access unmanaged data from one or more cloud storage tables of a data lake; filtering, by the one or more processors, the one or more cloud storage tables to find a set of data files for processing a query, wherein finding the set of data files uses information stored in a metadata cache; and retrieving, by the one or more processors, the unmanaged data from the set of data files.

In an example, the unmanaged data includes data that can be manipulated directly by end-users without being controlled by the query engine. In another example, the unmanaged data is manipulated without being processed through a data warehouse. In yet another example, the method further includes providing, by the one or more processors, the unmanaged data to a query engine for processing the query.

In yet another example, the information stored in the metadata cache includes an identification of data files residing in the data lake and a table of the one or more cloud storage tables to which the data files belong. In yet another example, the information stored in the metadata cache includes statistics about the set of data files and the method further includes: determining, by the one or more processors, the set of data files has a particular schema using the information stored in the metadata cache; and filtering, by the one or more processors, the set of data files based on the particular schema and the statistics about the set of the data files. In yet another example, the information stored in the metadata cache includes historical information and filtering the one or more cloud storage tables further comprises accessing previous states of the cloud storage tables using the historical information stored in the metadata cache.

In yet another example, the method further includes generating, by the one or more processors, the metadata cache by listing all data files in the one or more cloud storage tables. In yet another example, the method further includes: receiving, by the one or more processors, a notification that a data file of the one or more cloud storage tables is added, updated, or removed from the one or more cloud storage tables; and updating, by the one or more processors, the metadata cache based on the notification. In yet another example, the method further includes: listing, by the one or more processors, files added, updated, or removed since a previous update to the metadata cache; and updating, by the one or more processors, the metadata cache based on the listing as part of processing the query.

In yet another example, the cloud storage tables reside in different clouds of different cloud storage platforms. In yet another example, the method further includes determining, by the one or more processors, that the unmanaged data is visible to the query engine based on a configurable staleness of the metadata cache.

Another aspect of the disclosure provides for a system including: one or more processors; and one or more storage devices coupled to the one or more processors and storing instructions that, when executed by the one or more processors, cause the one or more processors to perform operations for processing queries, the operations including: receiving a request from a query engine to access unmanaged data from one or more cloud storage tables of a data lake; filtering the one or more cloud storage tables to find a set of data files for processing a query, wherein finding the set of data files uses information stored in a metadata cache; and retrieving the unmanaged data from the set of data files.

In an example, the unmanaged data includes data that can be manipulated directly without being controlled by the query engine.

In another example, the information stored in the metadata cache includes an identification of data files residing in the data lake and a table of the one or more cloud storage tables to which the data files belong. In yet another example, the information stored in the metadata cache includes statistics about the set of data files and the operations further include: determining the set of data files has a particular schema using the information stored in the metadata cache; and filtering the set of data files based on the particular schema and the statistics about the set of data files. In yet another example, the information stored in the metadata cache includes historical information and filtering the one or more cloud storage tables further comprises accessing previous states of the cloud storage tables using the historical information stored in the metadata cache.

In yet another example, the operations further include: receiving a notification that a data file of the one or more cloud storage tables is added, updated, or removed from the one or more cloud storage tables; and updating the metadata cache based on the notification. In yet another example, the operations further include: listing files added, updated, or removed since a previous update to the metadata cache; and updating the metadata cache based on the listing as part of processing the query.

Yet another aspect of the disclosure provides for a non-transitory computer readable medium for storing instructions that, when executed by one or more processors, cause the one or more processors to perform operations for processing queries, the operations including: receiving a request from a query engine to access unmanaged data from one or more cloud storage tables of a data lake; filtering the one or more cloud storage tables to find a set of data files for processing a query, wherein finding the set of data files uses information stored in a metadata cache; and retrieving the unmanaged data from the set of data files.

DETAILED DESCRIPTION

Figure 1:
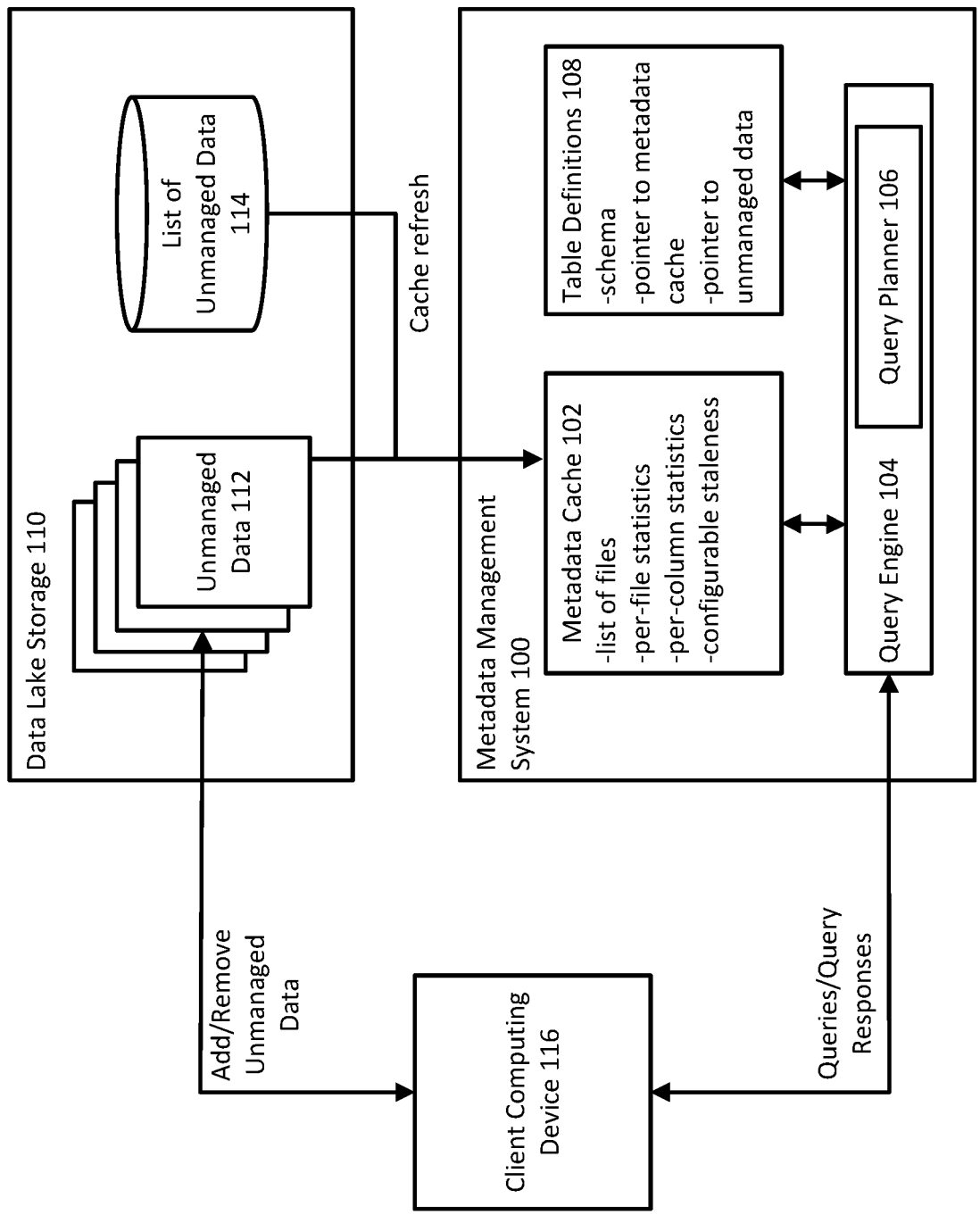
FIG. 1 depicts a block diagram of an example metadata management system for a cloud storage platform for data lakes according to aspects of the disclosure.

The technology relates generally to a metadata cache for one or more object stores that form a data lake. The metadata cache can allow for accelerating query processing by a query engine by directly accessing unmanaged data from the one or more object stores as opposed to accessing the data via a data warehouse. Unmanaged data can correspond to files whose lifecycle is not determined by the data warehouse.

A data warehouse cannot control a lifecycle of the unmanaged data stored in a data lake. The unmanaged data stored in the data lake can be considered external to the data warehouse. For example, the unmanaged data stored in the data lake can be added or removed at any time without being processed through the data warehouse. Without the metadata cache, the data warehouse has no information about which data files belong to a table being queried and must therefore exhaustively list all files during query execution. The metadata cache allows for optimizations typically available for data stored in the data warehouse to the unmanaged data stored in the data lakes.

The metadata cache can have a configurable staleness, such as a maximum bound of staleness, e.g., 1 hour. For example, if the configurable staleness is 1 hour, newer files added to data lakes can take up to 1 hour to be visible to data warehouse queries. Query processing performance can increase as the maximum bound of staleness is increased. The configurable staleness can be 0, indicating strong consistency for the metadata cache, if supported by the object store.

The metadata cache contains current and historical information about states of tables, such as which data files residing in an object store are part of or were part of which cloud storage tables. The metadata cache also contains statistics about each data file and its contents, such as row count, null value count, min/max values for each column, and/or number of distinct values.

The metadata cache can accelerate processing of queries via a query planner. The query planner can use the current information in the metadata cache about the table states to preliminarily prune files, reducing the total amount of data read of the object store to process a query. For example, for a query associated with a particular data file, the query planner can use the current information about the data file in the metadata cache to determine the table in which the data file is stored. The query planner can then read the files in that table to find the data file to process the query.

Further, the query planner can use the current information in the metadata cache to improve decisions for processing a query. For example, the query planner can use a broadcast join if one side of a join is small based on the statistics, such as number of rows in the files, size of data in the columns, and/or total file sizes. As another example, the query planner can use table schemas and the statistics stored in the metadata cache to perform dynamic predicate pruning or dynamic partition pruning, inferring extra filtering predicates on tables with particular schemas, such as star/snowflake schemas.

The query planner can further use the historical information about previous states of tables for querying past states of the table. For example, the historical information can include previous states of tables up to a configurable amount of time in the past. The query planner can process queries associated with the past states of the table up to that amount of time in the past using the historical information, allowing users to query past versions of the table. As another example, if the query planner determines it does not have current information in the metadata cache about a particular data file, the query planner can use the historical information about the data file to predict a current state of the data file for processing the query.

The metadata cache can further allow the data lake to update and/or maintain data warehouse features, such as indices and materialized views. The data lake can use the current and historical information in the metadata cache to compute changes in tables between two points in time, referred to as deltas. The data lake can use the deltas to incrementally update and maintain the data warehouse features. For example, a delta for materialized views can be periodically generated by comparing the number of materialized views in the current information to the number of materialized views in the historical information. The metadata cache allows for efficiently computing the deltas that need to be applied to downstream materialized views.

A data warehouse can populate and maintain the metadata cache using plain object store listing, event-driving, and/or delta listing. Plain object store listing can correspond to listing all files in an object store, reading the files to collect statistics, and creating the metadata cache from the files and statistics. Event-driving can correspond to the object store providing a notification each time a file is added/updated/deleted from the object store, thus allowing for updating the metadata cache in real time. Delta listing can correspond to listing files added or removed since the previous time the metadata cache was updated, which can be used to update the metadata cache incrementally. Delta listing can be run as part of each query to remove any staleness from the metadata cache, ensuring that the query engine has up-to-date metadata information by combining results from the cache and delta listing.

The metadata cache can also accelerate cross-cloud queries. Cross-cloud queries can correspond to query processing based on data lakes for different cloud storage systems. There is a metadata cache hosted in each cloud. The query engine combines information from all metadata caches to serve the cross-cloud queries.

FIG. 1 depicts a block diagram of an example metadata management system 100 for a cloud storage platform for data lakes. The metadata management system 100 can include a metadata cache 102, a query engine 104, a query planner 106, and table definitions 108. The metadata cache 102 can be coupled to a data lake storage 110 containing unmanaged data 112 and a list of the unmanaged data 114. The metadata management system 100 can be configured to accelerate query processing of the query engine 104 by accessing the unmanaged data 112 through the metadata cache 102 and the table definitions 108.

The unmanaged data 112 can correspond to files or other tabular data with uncontrolled lifecycles. The unmanaged data 112 is different from unstructured data, which can refer to data that is not in tabular format, such as images, pdfs, etc.

As an example, for the unmanaged data 112, the data lake storage 110 can correspond to an object store containing files that can be added and/or removed, such as by a client computing device 116, at any time without being processed. The metadata management system 100 therefore has no information about locations of files of the unmanaged data 112 in the data lake storage 110, such as which files belong to which tables in the data lake storage 110. With the metadata cache 102, the metadata management system 100 no longer needs to exhaustively list all files of the unmanaged data 112 to process a query, such as a query from the client computing device 116, such as to determine which files belong to a table being queried. This can significantly increase query processing speed to generate a query response, such as for the client computing device 116. While FIG. 1 depicts the same client computing device 116 both adding/removing unmanaged data and sending queries, any number of client computing devices can be adding and/or removing unmanaged data from the data lake storage 110 as well as sending queries and receiving query responses. Further, of the client computing devices, one client computing device can add and/or remove unmanaged data while another client computing device can send a query and receive a query response.

The metadata cache 102 can include current and historical information about the unmanaged data 112. For example, the metadata cache 102 can include a list of files of the unmanaged data 112. The list of files can include which files residing in the data lake storage 110 are contained in or were contained in which tables of the data lake storage 110. The metadata cache 102 can also include previous states of tables up to a configurable amount of time in the past, depending on the amount of memory available, allowing for processing of queries associated with past versions of the tables in the data lake storage 110.

The metadata cache 102 can further include statistics about the unmanaged data 112. The metadata cache 102 can include the statistics at different levels of granularity, such as per-table statistics, per-table segment statistics like per-file statistics, and/or per-column statistics. For example, the metadata cache 102 can include statistics about the files residing in the data lake storage 110, such as row count, null value count, minimum and/or maximum values, and/or distinct value count. Row count can refer to the number of rows in one or more files of the data lake storage 110. Null value count can refer to the number of null values, e.g., lack of entry, in one or more columns and/or files of the data lake storage 110. Minimum and/or maximum values can respectively refer to the minimum and/or maximum entry for each column and/or file of the data lake storage 110. Distinct value count can refer to the number of unique entries in one or more columns and/or files of the data lake storage 110.

The metadata cache 102 can have a configurable staleness, which can correspond to an amount of time before more recent unmanaged data added to the data lake storage 110 is visible to the query engine 104. The configurable staleness can be a maximum bound of staleness. For example, if the configurable staleness is set to 1 hour, newer files added to the data lake storage 110 may not be visible to the query engine 104 for up to 1 hour. As another example, if the configurable staleness is set to 0, newer files added to the data lake storage 110 can be immediately visible to the query engine 104, indicating the metadata cache 102 has strong consistency. Increasing the configurable staleness can increase query processing speed at the cost of potentially inaccurate data.

The table definitions 108 can correspond to an inventory of the unmanaged data 112 in the data lake storage 110. The table definitions 108 can include one or more attributes describing the unmanaged data 112 that the query engine 104 can use to execute queries. For example, the table definitions 108 can include schemas, pointers to the metadata cache 102, and/or pointers to the unmanaged data 112.

The query planner 106 can access the metadata cache 102 and table definitions 108 to accelerate processing of queries to be executed by the query engine 104. While FIG. 1 depicts the query planner 106 as part of the query engine 104, the query planner 106 may alternatively be a separate entity from the query engine 104. The query planner 106 can access the current information in the metadata cache 102 to preliminarily prune the unmanaged data 112 to reduce the amount of data to read when processing a query. For example, the query planner 106 can use information about table states for determining which files do not need to be read for processing a query. For a query associated with a file, the query planner 106 can determine the table in the data lake storage 110 in which the file is stored using the current information in the metadata cache 102 about that file. The query planner 106 can read the files in the table to search for the file for the query, rather than having to read all files in the data lake storage 110 to search for the file for the query.

The query planner 106 can access the current information in the metadata cache 102 to improve decisions in processing a query. For example, the query planner 106 can determine a broadcast join should be utilized based on the statistics. The query planner 106 can determine from the statistics, such as number of rows in the files, size of data in the columns, and/or total file sizes, that one side of a join query is small relative to the other side. In response to determining one side is small, the query planner 106 can determine to use a broadcast join to process the join query. As another example, the query planner 106 can perform dynamic predicate pruning or dynamic partition pruning using the statistics in the metadata cache 102 and the table schemas in the table definitions 108. The query planner 106 can determine a table has a particular schema from the table definitions 108, such as a star schema or snowflake schema, and can infer extra filtering predicates on the tables using the statistics in the metadata cache 102 based on these schemas.

For instance, the data lake storage 110 can include two tables, where the first table is a catalog table having an identifier column and a category column and the second table is a sales table having an identifier column and a price column. The query engine 104 can receive a query, such as from the client computing device 116, to retrieve "all sales where the category is groceries". The query planner 106 can infer that the identifier column is present in both the first table and the second table from the statistics of the metadata cache 102. The query planner 106 can read the catalog table to fetch identifiers where the category is groceries and filter the sales table with the identifiers. The query engine 104 only needs to scan the filtered sales table, rather than the entire sales table, to generate and transmit a query response for the query.

The query planner 106 can access the historical information in the metadata cache 102 to query previous versions of the unmanaged data 112 in the data lake storage 110. For example, the query planner 106 can use previous states of tables of the data lake storage 110 to process queries associated with the previous states of the tables. The query engine 104 can receive a query associated with a previous state of table in the data lake storage 110. The query planner 106 can process the query using the previous state of the table from the metadata cache 102. The query engine 104 can transmit a query response generated from retrieving files based on the previous state of the table. As another example, the query planner 106 can determine current information about a particular file is missing from the metadata cache and, rather than reading all files in the data lake storage 110, the query planner 106 can use the historical information about the file to predict a current state of the file to process a query about the file.

The metadata management system 100 can populate and maintain the metadata cache 102 using plain object store listing, event driving, and/or delta listing. For plain object store listing, the metadata management system 100 can list all files of the unmanaged data 112, such as the list of unmanaged data 114 in the data lake storage 110. The metadata management system 100 can read the files to generate statistics on the files. The metadata management system 100 can populate the metadata cache from the list of unmanaged data 114 and the statistics. For event driving, the metadata management system 100 can receive a notification each time a file is added, updated, and/or deleted from the data lake storage 110. The metadata management system 100 can receive the notification from the client computing device 116 that is adding, updating, and/or removing a file or can receive the notification from the data lake storage 110 itself. The metadata management system 100 can update the metadata cache 102 in real time based on the notifications. For delta listing, the metadata management system 100 can list files added, update, and/or removed since the previous time the metadata cache 102 was refreshed. The metadata management system 100 can use the list of files to refresh the metadata cache 102 incrementally, such as part of each query received by the query engine 104 to ensure the query planner 106 accesses up-to-date information.

The metadata management system 100 can use the metadata cache 102 to manage indices and/or materialized views of the data lake storage 110. The metadata management system 100 can access the current and historical information in the metadata cache 102 to compute changes to tables between two points in time, which can be referred to as deltas. The metadata management system 100 can use the deltas to incrementally update the indices and/or materialized views. For example, the metadata management system 100 can periodically generate a delta for materialized views by comparing the current state of the table in the metadata cache 102 to the previous state of the table on which the materialized view was generated.

Figure 2:
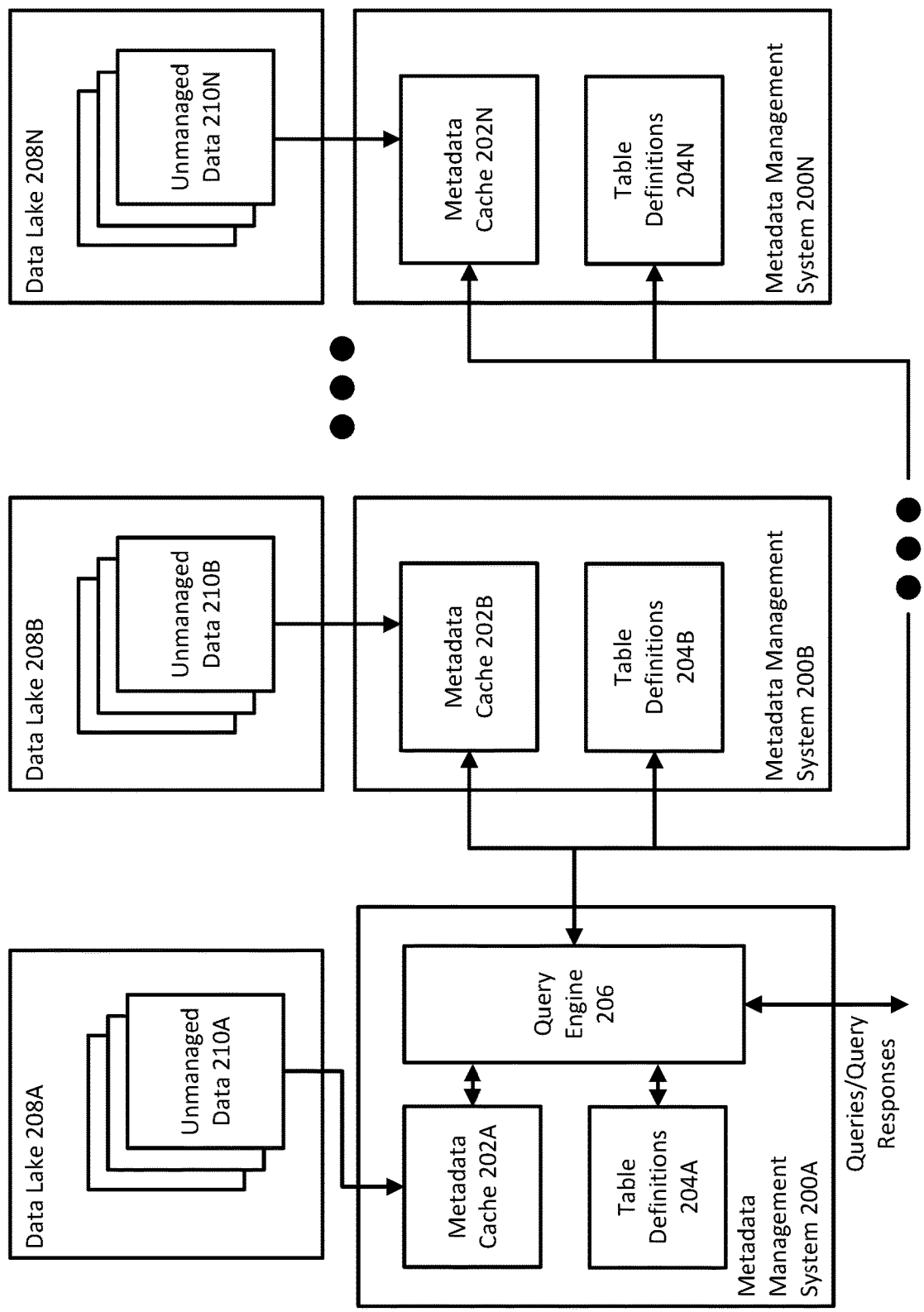
FIG. 2 depicts a block diagram of a plurality of metadata management systems for different cloud storage platforms for data lakes according to aspects of the disclosure.

FIG. 2 depicts a block diagram of a plurality of metadata management systems 200A-N for different cloud storage platforms for data lakes. While FIG. 2 depicts three metadata management systems, any number of metadata management systems can encompass the plurality. Each metadata management system 200A-N can include a metadata cache 202A-N and table definitions 204A-N. The metadata management system 200A includes a query engine 206. The other metadata management systems may also include a query engine, even though they are not shown in FIG. 2. Each metadata management system 200A-N can be coupled to a data lake storage 208A-N containing unmanaged data 210A-N. Overall, the metadata management system 200A, as well as other metadata management systems of the plurality, can correspond to the metadata management system 100 as depicted in FIG. 1.

The metadata management systems 200A-N can utilize the metadata caches 202A-N to accelerate cross-cloud queries. The query engine 206 can include a query planner (not shown) to access current information in the metadata caches 202A-N to preliminarily prune the unmanaged data 210A-N to reduce the amount of files to read when processing the cross-cloud query. For a cross-cloud query associated with a table stored in one or more of the data lakes 208A-N, the query planner of the query engine 206 can combine current information from the metadata caches 202A-N to reduce the amount of data read from the data lakes 208A-N for processing the cross-cloud query. Combining the current information from the metadata caches 202A-N can also reduce the amount of data transfer across clouds and their associated egress costs for processing the cross-cloud query.

Figure 3:
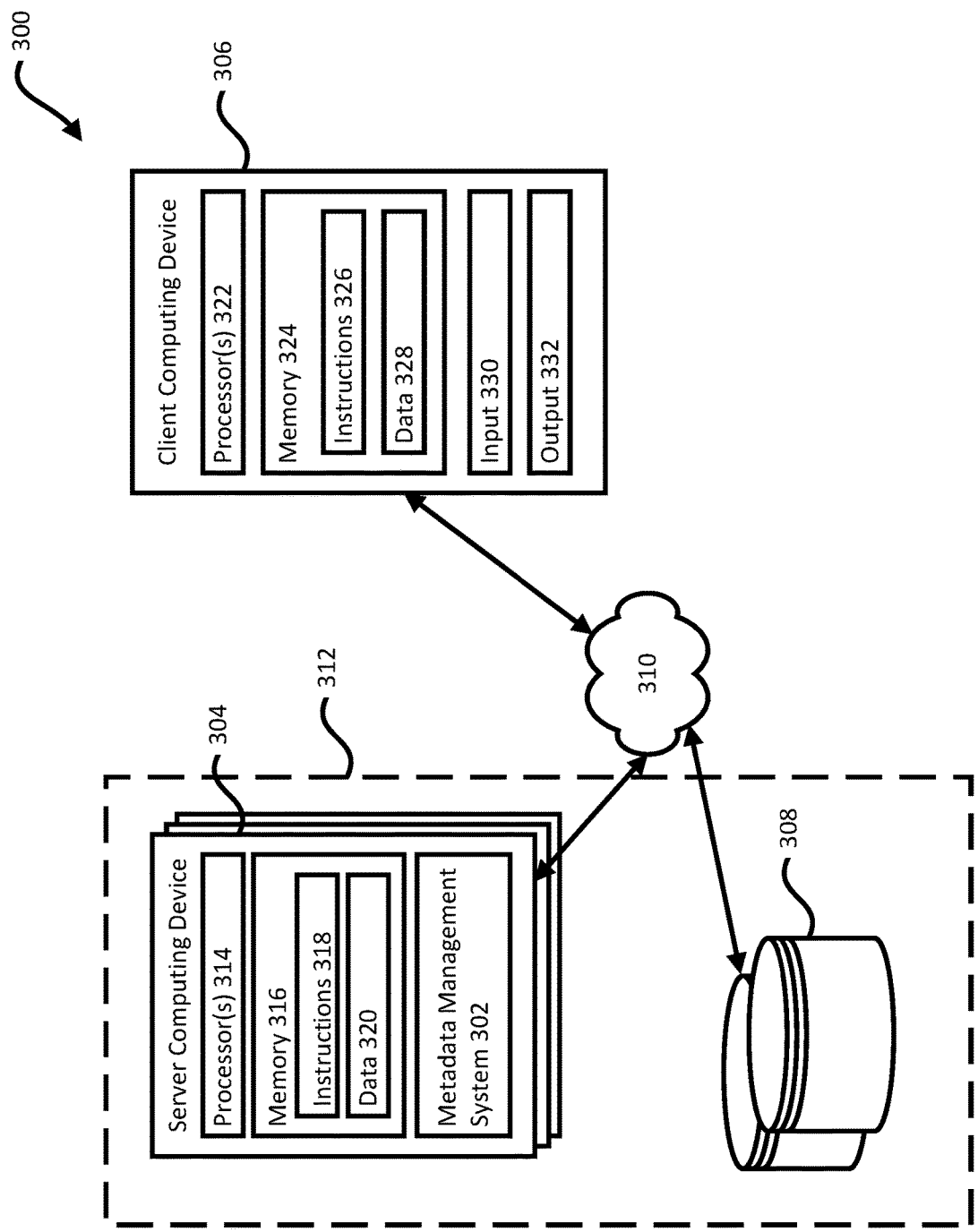
FIG. 3 depicts a block diagram of an example computing environment implementing a metadata management system for a cloud storage system according to aspects of the disclosure.

FIG. 3 depicts a block diagram of an example computing environment 300 implementing a metadata management system 302 for a cloud storage system. The metadata management system 302 can correspond to the metadata management system 100 as depicted in FIG. 1. The metadata management system 302 can be implemented on one or more devices having one or more processors in one or more locations, such as in a server computing device 304. A client computing device 306 and the server computing device 304 can be communicatively coupled to one or more storage devices 308 over a network 310. The server computing device 304 and the storage devices 308 can form part of a cloud computing system 312 for cloud computing services such as Infrastructure as a Service (IaaS), Platform as a Service (PaaS), and/or Software as a Service (SaaS).

For example, the client computing device 306 may use the cloud computing system 312 as a service that provides software applications, such as accounting, word processing, inventory tracking, fraud detection, file sharing, video sharing, audio sharing, communication, or gaming. As another example, the client computing device 306 can access the cloud computing system 312 as part of one or more operations that employ machine learning, deep learning, and/or artificial intelligence technology to train the software applications. The cloud computing system 312 can provide model parameters that can be used to update machine learning models for the software applications.

The storage devices 308 can be a combination of volatile and non-volatile memory and can be at the same or different physical locations than the computing devices 304, 306. For example, the storage devices 308 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 304 can include one or more processors 314 and memory 316. The memory 316 can store information accessible by the processors 314, including instructions 318 that can be executed by the processors 314. The memory 316 can also include data 320 that can be retrieved, manipulated, or stored by the processors 314. The memory 316 can be a type of non-transitory computer readable medium capable of storing information accessible by the processors 314, such as volatile and non-volatile memory. The processors 314 can include one or more central processing units (CPUs), graphic processing units (GPUs), field-programmable gate arrays (FPGAs), and/or application-specific integrated circuits (ASICs), such as tensor processing units (TPUs).

The instructions 318 can include one or more instructions that when executed by the processors 314, cause the one or more processors to perform actions defined by the instructions 318. The instructions 318 can be stored in object code format for direct processing by the processors 314, or in other formats including interpretable scripts or collections of independent source code modules that are interpreted on demand or compiled in advance. The instructions 318 can include instructions for implementing the metadata management system 302. The metadata management system 302 can be executed using the processors 314, and/or using other processors remotely located from the server computing device 304.

The data 320 can be retrieved, stored, or modified by the processors 314 in accordance with the instructions 318. The data 320 can be stored in computer registers, in a relational or non-relational database as a table having a plurality of different fields and records, or as JSON, YAML, proto, or XML documents. The data 320 can also be formatted in a computer-readable format such as, but not limited to, binary values, ASCII, or Unicode. Moreover, the data 320 can include information sufficient to identify relevant information, such as numbers, descriptive text, proprietary codes, pointers, references to data stored in other memories, including other network locations, or information that is used by a function to calculate relevant data.

The client computing device 306 can also be configured similarly to the server computing device 304, with one or more processors 322, memory 324, instructions 326, and data 328. The client computing device 306 can also include a client input 330 and a client output 332. The client input 330 can include any appropriate mechanism or technique for receiving input from a client, such as keyboard, mouse, mechanical actuators, soft actuators, touchscreens, microphones, and sensors.

The server computing device 304 can be configured to transmit data to the client computing device 306, and the client computing device 306 can be configured to display at least a portion of the received data on a display implemented as part of the client output 332. The client output 332 can also be used for displaying an interface between the client computing device 306 and the server computing device 304. The client output 332 can alternatively or additionally include one or more speakers, transducers or other audio outputs, a haptic interface or other tactile feedback that provides non-visual and non-audible information to a client of the client computing device 306.

Although FIG. 3 illustrates the processors 314, 322 and the memories 316, 324 as being within the computing devices 304, 306, components described herein, including the processors 314, 322 and the memories 316, 324 can include multiple processors and memories that can operate in different physical locations and not within the same computing device. For example, some of the instructions 318, 326 and the data 320, 328 can be stored on a removable SD card and other instructions within a read-only computer chip. Some or all of the instructions 31, 326 and data 320, 328 can be stored in a location physically remote from, yet still accessible by, the processors 314, 322. Similarly, the processors 314, 322 can include a collection of processors that can perform concurrent and/or sequential operations. The computing devices 304, 306 can each include one or more internal clocks providing timing information, which can be used for time measurement for operations and programs run by the computing devices 304, 306.

The computing devices 304, 306 can be capable of direct and indirect communication over the network 310. The devices 304, 306 can set up listening sockets that may accept an initiating connection for sending and receiving information. The network 310 itself can include various configurations and protocols including the Internet, World Wide Web, intranets, virtual private networks, wide area networks, local networks, and private networks using communication protocols proprietary to one or more companies. The network 310 can support a variety of short- and long-range connections. The short- and long-range connections may be made over different bandwidths, such as 2.402 GHz to 2.480 GHz, commonly associated with the Bluetooth® standard, 2.4 GHz and 5 GHZ, commonly associated with the Wi-Fi® communication protocol; or with a variety of communication standards, such as the LTE® standard for wireless broadband communication. The network 310, in addition or alternatively, can also support wired connections between the computing devices 304, 306, including over various types of Ethernet connection.

Although a single server computing device 304 and user computing device 306 are shown in FIG. 3, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Figure 4:
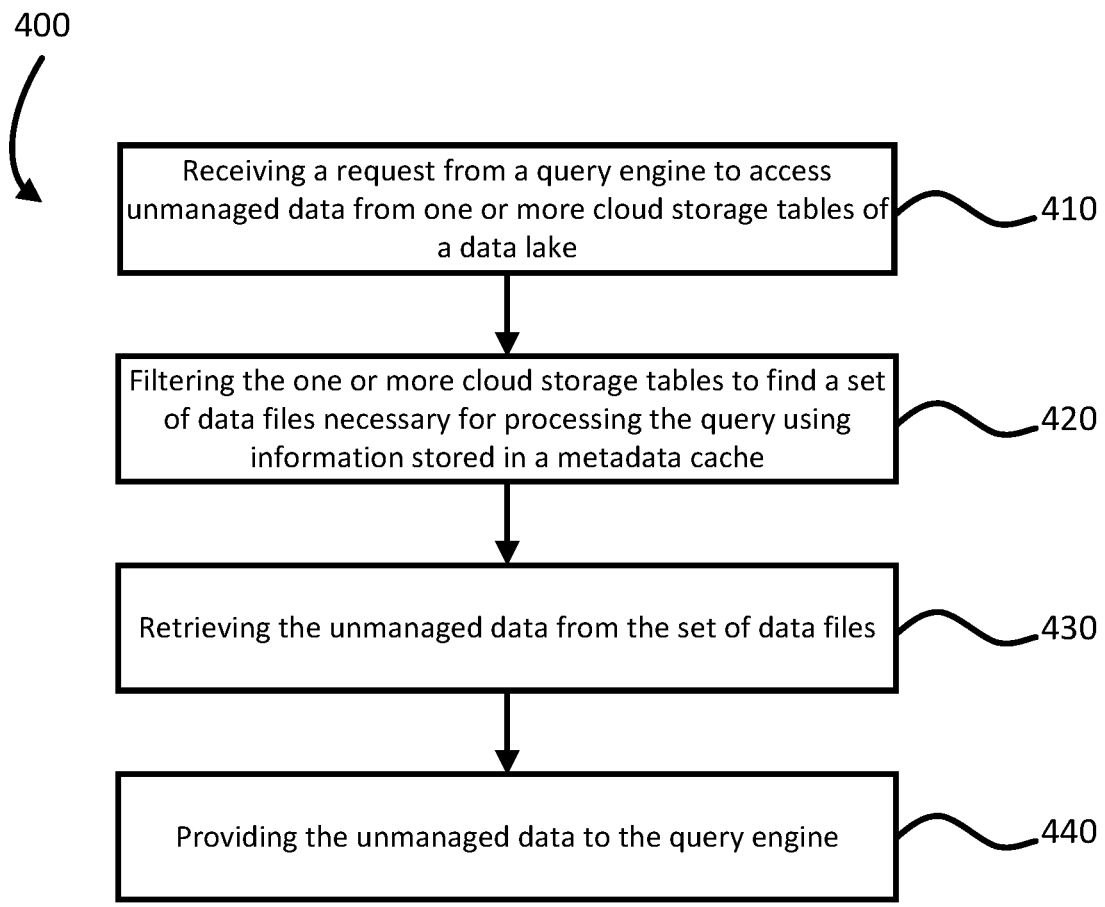
FIG. 4 depicts a flow diagram of an example process for processing queries according to aspects of the disclosure.

FIG. 4 depicts a flow diagram of an example process 400 for processing queries. The example process 400 can be performed on a system of one or more processors in one or more locations, such as the example metadata management system 100 as depicted in FIG. 1.

As shown in block 410, the metadata management system 100 can receive a request from a query engine 104 to access unmanaged data 112 from one or more cloud storage tables of a data lake 110. The request can be based on a query received from a client computing device. The unmanaged data 112 can include data that can be manipulated directly without being controlled by the query engine 104. For example, the unmanaged data 112 can include data files that can be added and/or removed by a client computing device at any time without being processed by the query engine 104. The cloud storage tables can reside in the same cloud of a cloud storage platform or different clouds of different cloud storage platforms.

As shown in block 420, the metadata management system 100 can filter the one or more cloud storage tables to find a set of data files necessary for processing the query. The metadata management system 100 can use information stored in a metadata cache 102 to filter the one or more cloud storage tables. The information stored in the metadata cache 102 can include states of the one or more cloud storage tables, such as which data files residing in the data lake are part of which cloud storage table of the one or more cloud storage tables. The information stored in the metadata cache 102 can include an identification of data files residing in the data lake and a table of the one or more cloud storage tables to which the data files belong.

The information stored in the metadata cache 102 can also include statistics about the unmanaged data 112, such as per-file statistics and/or per-column statistics. The metadata management system 100 can further determine the set of files has a particular schema using the information stored in the metadata cache 102. The metadata management system 100 can further filter the set of data files based on the particular schema. The metadata management system 100 can also utilize broadcast join based on the statistics about the unmanaged data 112.

The information stored in the metadata cache 102 can further include historical information. The metadata management system 100 can utilize the historical information to process queries associated with previous versions of tables in the data lake 110 based on previous states of tables stored in the metadata cache 102.

The metadata management system 100 can determine that the unmanaged data 112 is visible based on a configurable staleness of the metadata cache 102. The configurable staleness can include a maximum bound of staleness for the unmanaged data 112 from the one or more cloud storage tables.

As shown in block 430, the metadata management system 100 can retrieve the unmanaged data 112 from the set of data files. In response to the filtering, the metadata management system 100 does not need to read all data files in the data lake 110. Rather, the metadata management system 100 can read the files from the set of data files that were filtered to retrieve the unmanaged data 112.

As shown in block 440, the metadata management system 100 can provide the unmanaged data to the query engine 104 to process the query. The query engine 104 can provide a query response to the client computing device based on processing the query.

Figure 5:
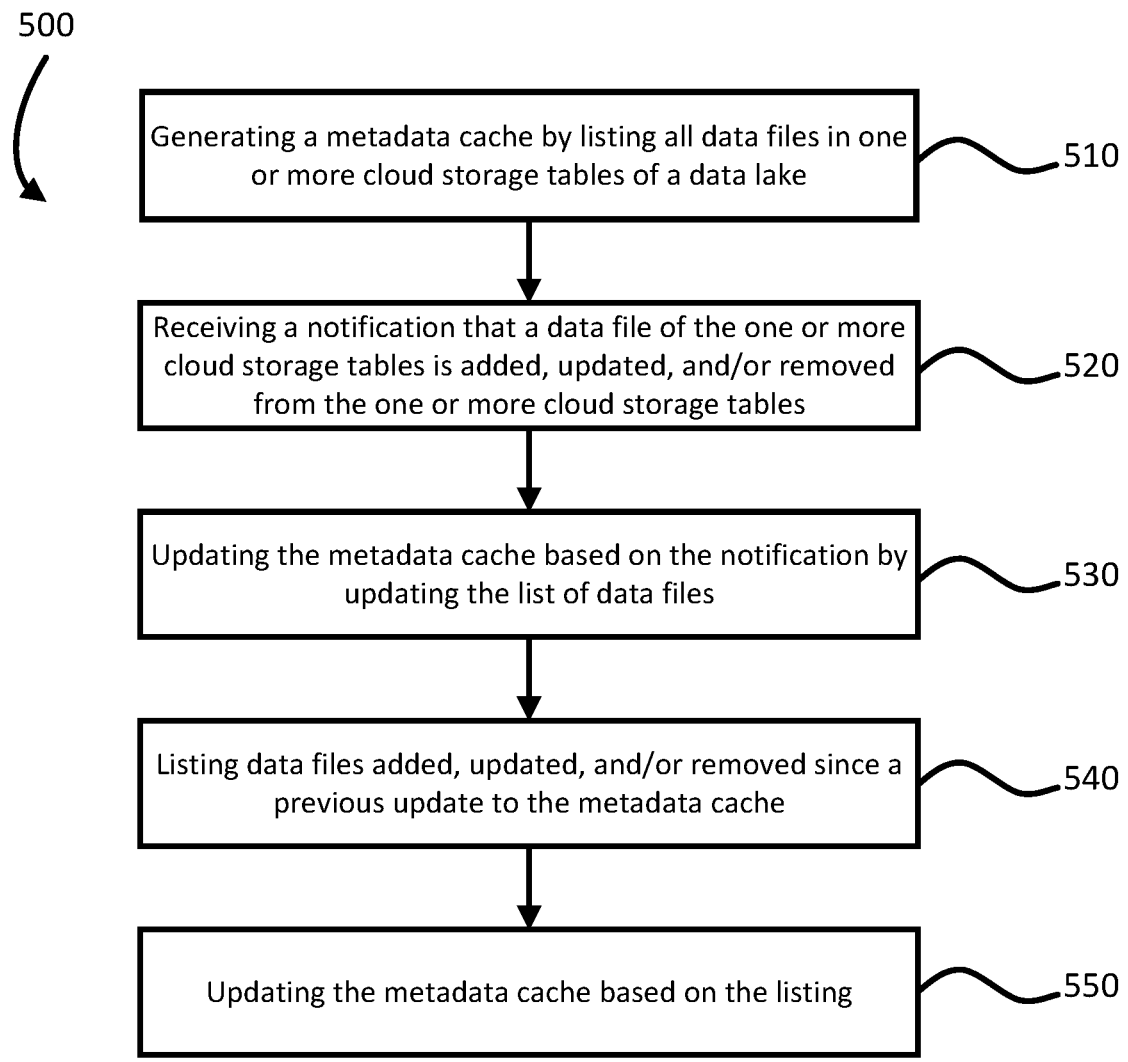
FIG. 5 depicts a flow diagram of an example process for managing a metadata cache according to aspects of the disclosure.

FIG. 5 depicts a flow diagram of an example process 500 for managing a metadata cache. The example process 500 can be performed on a system of one or more processors in one or more locations, such as the example metadata management system 100 as depicted in FIG. 1.

As shown in block 510, the metadata management system 100 can generate a metadata cache 102 by listing all data files in one or more cloud storage tables of unmanaged data 112 a data lake 110. The metadata management system 100 can further read the data files to generate statistics on the data files. The metadata management system 100 can include the list of data files and the statistics in the metadata cache 102.

As shown in block 520, the metadata management system 100 can receive a notification that a data file of the one or more cloud storage tables is added, updated, and/or removed from the one or more cloud storage tables. For example, the data file can be added, updated, and/or removed by a client computing device. As shown in block 530, the metadata management system 100 can update the metadata cache 102 based on the notification. For example, the metadata management system 100 can update the list of data files in real time based on what data file is added, updated, and/or removed from the notification.

As shown in block 540, the metadata management system 100 can list data files added, updated, and/or removed since a previous update to the metadata cache 102. The previous update can correspond to the last time the metadata cache 102 was refreshed. As shown in block 550, the metadata management system 100 can update the metadata cache 102 based on the listing. The update to the metadata cache 102 can be incremental, such as part of processing a query.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

The phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for processing queries, comprising:
receiving, by one or more processors, a request from a query engine to access unmanaged data from a plurality of cloud storage tables of a data lake for processing a query;
accessing, by the one or more processors, information about the unmanaged data stored in a metadata cache, the information comprising table states for the cloud storage tables, schema for the cloud storage tables, and statistics about the unmanaged data;
identifying, by the one or more processors, a first table and a second table of the cloud storage tables for processing the query based on the table states;
inferring, by the one or more processors, that an identifier column is present in both the first table and the second table based on the schemas for the cloud storage tables and the statistics about the unmanaged data;
retrieving, by the one or more processors, identifiers from the identifier column of the first table based on data in a second column of the first table matching a condition of the query;
filtering, by the one or more processors, the second table based on the identifiers retrieved from the first table to generate a filtered table; and
retrieving, by the one or more processors, the unmanaged data from the filtered table for responding to the query.

2. The method of claim 1, wherein the unmanaged data comprises data that can be manipulated directly without being controlled by the query engine.

3. The method of claim 2, wherein the unmanaged data is manipulated without being processed through a data warehouse.

4. The method of claim 1, further comprising:
generating, by the one or more processors, a query response containing the unmanaged data; and
providing, by the one or more processors, the query response to the query engine.

5. The method of claim 1, wherein the table states for the cloud storage tables comprise a table indicating to which of the plurality cloud storage tables the unmanaged data belongs.

6. The method of claim 1, wherein the information stored in the metadata cache comprises historical information and identifying the first table and the second table for processing the query is further based on previous table states for the cloud storage tables.

7. The method of claim 1, further comprising generating, by the one or more processors, the metadata cache by listing all data files in the one or more cloud storage tables.

8. The method of claim 1, further comprising:
receiving, by the one or more processors, a notification that a data file of the one or more cloud storage tables is added, updated, or removed from the one or more cloud storage tables; and
updating, by the one or more processors, the metadata cache based on the notification.

9. The method of claim 1, further comprising:
listing, by the one or more processors, files added, updated, or removed since a previous update to the metadata cache; and
updating, by the one or more processors, the metadata cache based on the listing as part of processing the query.

10. The method of claim 1, wherein the cloud storage tables reside in different clouds of different cloud storage platforms.

11. The method of claim 1, further comprising determining, by the one or more processors, that the unmanaged data is visible to the query engine based on a configurable staleness of the metadata cache.

12. A system comprising:
one or more processors; and
one or more storage devices coupled to the one or more processors and storing instructions that, when executed by the one or more processors, cause the one or more processors to perform operations for processing queries, the operations comprising:
receiving a request from a query engine to access unmanaged data from a plurality of cloud storage tables of a data lake for processing a query;
accessing information about the unmanaged data stored in a metadata cache, the information comprising table states for the cloud storage tables, schema for the cloud storage tables, and statistics about the unmanaged data;
identifying a first table and a second table of the cloud storage tables for processing the query based on the table states;
inferring that an identifier column is present in both the first table and the second table based on the schemas for the cloud storage tables and the statistics about the unmanaged data;
retrieving identifiers from the identifier column of the first table based on data in a second column of the first table matching a condition of the query;
filtering the second table based on the identifiers retrieved from the first table to generate a filtered table; and
retrieving the unmanaged data from the filtered table for responding to the query.

13. The system of claim 12, wherein the unmanaged data comprises data that can be manipulated directly without being controlled by the query engine.

14. The system of claim 12, wherein the table states for the cloud storage tables comprise a table indicating to which of the plurality of cloud storage tables the unmanaged data belongs.

15. The system of claim 12, wherein the information stored in the metadata cache comprises historical information and identifying the first table and the second table for processing the query is further based on previous table states for the cloud storage tables.

16. The system of claim 12, wherein the operations further comprise:
receiving a notification that a data file of the one or more cloud storage tables is added, updated, or removed from the one or more cloud storage tables; and
updating the metadata cache based on the notification.

17. The system of claim 12, wherein the operations further comprise:
listing files added, updated, or removed since a previous update to the metadata cache; and
updating the metadata cache based on the listing as part of processing the query.

18. A non-transitory computer readable medium for storing instructions that, when executed by one or more processors, cause the one or more processors to perform operations for processing queries, the operations comprising:
receiving a request from a query engine to access unmanaged data from a plurality of cloud storage tables of a data lake for processing a query;
accessing information about the unmanaged data stored in a metadata cache, the information comprising table states for the cloud storage tables, schema for the cloud storage tables, and statistics about the unmanaged data;
identifying a first table and a second table of the cloud storage tables for processing the query based on the table states;
inferring that an identifier column is present in both the first table and the second table based on the schemas for the cloud storage tables and the statistics about the unmanaged data;
retrieving identifiers from the identifier column of the first table based on data in a second column of the first table matching a condition of the query;
filtering the second table based on the identifiers retrieved from the first table to generate a filtered table; and
retrieving the unmanaged data from the filtered table for responding to the query.

\* \* \* \* \*